United States Patent [19]
Guiol et al.

[11] Patent Number: 5,410,102
[45] Date of Patent: Apr. 25, 1995

[54] CABLE BUSHING

[76] Inventors: Eric Guiol, Am Wasen 1, W-8835 Pleinfeld; Konrad Buckel, Nördl. Ringstr. 21, W-8832 Weissenburg; Helmut Rockl, Am Fürst 33, W-8835 Pleinfeld, all of Germany

[21] Appl. No.: 929,058

[22] Filed: Aug. 13, 1992

[30] Foreign Application Priority Data

Aug. 13, 1991 [DE] Germany .................. 9110007 U

[51] Int. Cl.⁶ .............................................. H05K 9/00
[52] U.S. Cl. ................................. 174/35 C; 174/35 R; 174/152 R; 174/151; 174/142
[58] Field of Search ............... 174/152 R, 151, 153 R, 174/140 R, 142, 144, 11 BH, 12 BH, 14 BH, 15.3, 18, 35 C, 35 R; 439/610

[56] References Cited

U.S. PATENT DOCUMENTS

| | | | |
|---|---|---|---|
| 1,845,699 | 2/1932 | Brown | 174/152 R X |
| 3,435,128 | 3/1969 | Dörwald | 174/151 |
| 3,779,078 | 12/1973 | Kaesser et al. | 174/152 R X |
| 4,358,632 | 11/1982 | Buch | 174/35 MS |
| 4,487,995 | 12/1984 | Hurwitz | 174/74 R |
| 4,547,623 | 10/1985 | Van Brunt et al. | 174/35 R |
| 5,012,042 | 4/1991 | Summach | 174/35 C |

FOREIGN PATENT DOCUMENTS

| | | |
|---|---|---|
| 969846 | 6/1975 | Canada . |
| 293042 | 5/1988 | European Pat. Off. . |
| 2558885 | 12/1975 | Germany . |
| 2909890 | 3/2979 | Germany . |
| 7721692 | 6/1977 | Sweden . |

Primary Examiner—Leo P. Picard
Assistant Examiner—Hyung S. Sough
Attorney, Agent, or Firm—Dena Meyer Weker

[57] ABSTRACT

A cable bushing which provides for an electromagnetically tight guidance of a shielded electrical cable, the jacket of which has been stripped from the shield in the bushing area, and the cable led through an opening in a partition, wherein electrically conductive part shells are mounted to the exposed part of the cable shield and an electrically conductive sleeve is slipped over the part shells. The sleeve is provided with a cover disk, which forms an integral part of the sleeve, with an annular disk which can be radially attached to the sleeve and incorporates a radial slot, with a threaded nut which can be screwed to the sleeve and with a counter-nut acting on the threaded nut. With the exception of the cover disk and the ring disk, all components of the cable bushing have smaller outer dimensions than the inner dimensions of the partition opening. In this way the cable bushing can be preassembled with a cable assembly before being mounted to the partition.

11 Claims, 5 Drawing Sheets

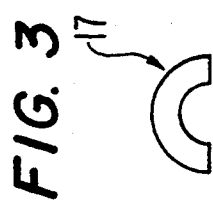
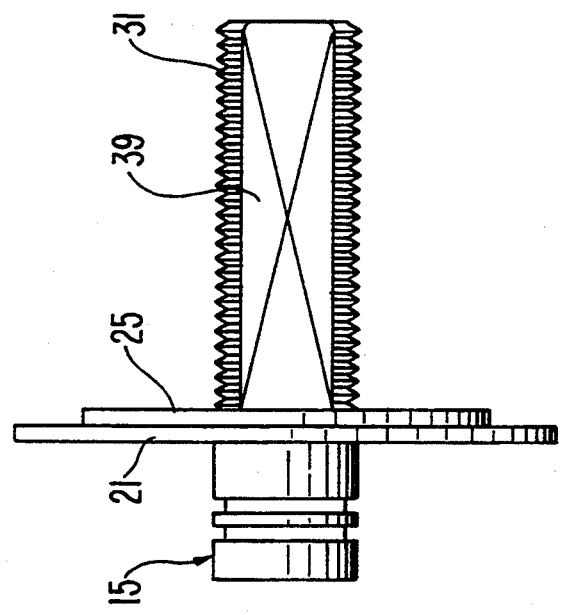
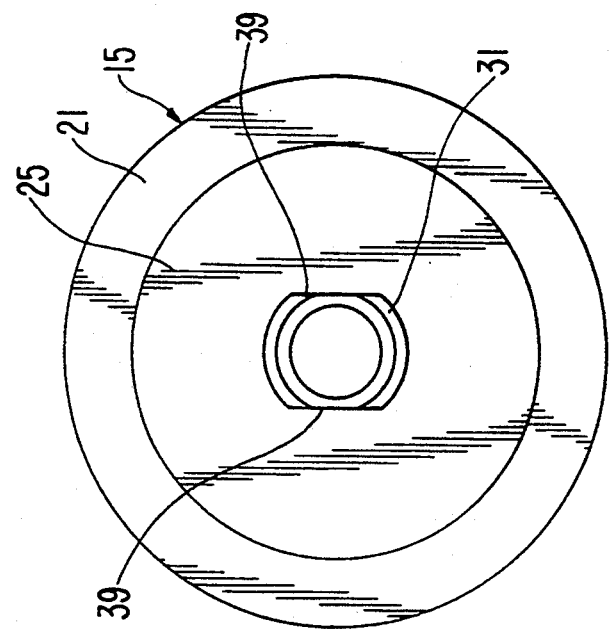

FIG. 7
FIG. 8
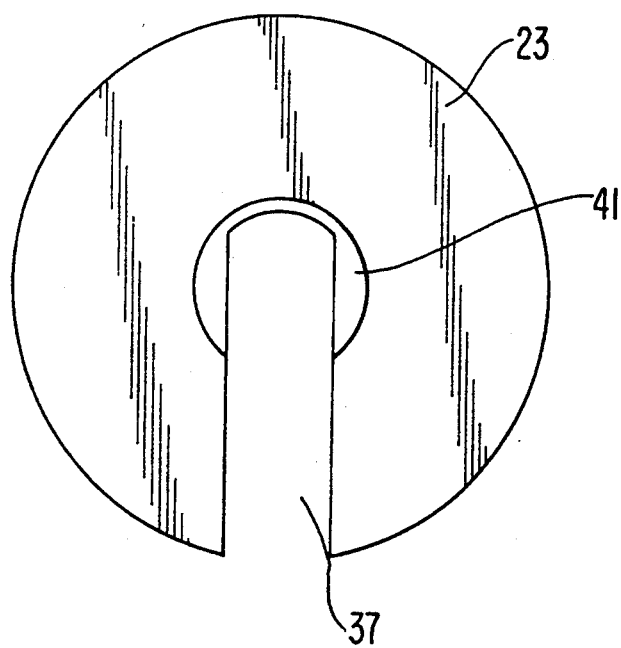
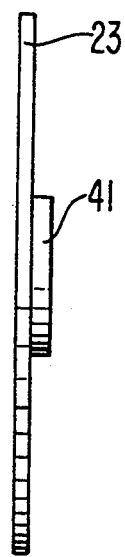

CABLE BUSHING

FIELD OF THE INVENTION

The invention relates to a cable bushing as a means to lead a shielded electrical cable of which the jacket has been stripped from the shield in the bushing area. The cable is led in an electromagnetically tight way through a partition opening with at least two part shells which can be attached to the exposed area of the electrically conductive shield from a radial direction, whose inner circumference is adapted to the outer circumference of the shield. The bushing contains an attachment device for attaching the cable bushing in the partition opening.

BACKGROUND OF THE INVENTION

German reference DE2909890 describes state of the art cable bushings for this type of application. The conventional device serves as a shield for conductor bundles that are fed through a wall. The bushings protect the cables from emitting or receiving electrical and electromagnetic waves of high frequencies. This device is provided with a frame which is inserted into a wall opening and which accommodates several filler pieces arranged in a matrix. Wherever cables are to be guided through the frame, the fillers are formed by two halves fitted together between which an opening is provided to accommodate the cable which is to be guided through. In the area located within the frame, the electric shield of the cable is exposed. The two halves surround the cable guided through them and are provided with a radial nose in the area of the exposed shield. This nose is in direct contact with the exposed cable shield and the end areas of the fitting halves, located at both sides of the radial nose, are in direct contact with the cable jacket. The fittings and filler pieces consist of an elastic material which incorporates aluminum particles. A clamping piece consisting of an elastic material is arranged in the center of the matrix of filler pieces and fittings. The clamping piece can be compressed by means of a screw bolt and interacting press plates in the axial direction of the bolt and pressed apart in the radial direction in order to clamp the filler pieces and fittings to the frame and the cables. This conventional bushing is complicated due to the number of components and the assembly process and therefore is rather costly. Costs are particularly high if only a single cable must be guided through an opening in a partition. A pre-assembly of this device by the cable manufacturer or harnessing company is not possible. If the screw bolt, the press plates and the interacting elastic fitting are eliminated for cost and space reasons due to the standard manufacturing tolerances, it is not possible to ensure a safe and consistent enclosure of both fitting halves around the exposed cable shield, which may result in electromagnetic leakage and interference.

DE-GM 7721692 describes a sleeve for guiding a cable through walls in a fireproof and gas-tight way. The sleeve consists of two sleeve parts which are separated in the longitudinal direction and consist of an elastic material which swells when exposed to heat. The inner circumferences of the sleeve halves are provided with a trough-like cavity filled with a sealing material such as caoutchouc.

DE-A-2558885 describes a cable inlet in installation housings provided with plate-shaped flanges which are mounted in an opening in the housing wall and through which sealing pieces are inserted which surround the cables and guide them through the housing wall. The sealing bodies are divided longitudinally by means of half shells which can be coupled to each other. They are held apart by coupling pieces arranged in the tangential direction and by outer securing rings. The securing rings consist of a plastic material and render it impossible to make contact with an exposed cable shield. The state of the art solution fails to provide for an electromagnetically tight guiding device through a partition opening.

There is a need for an improved cable bushing that is electromagnetically tight and is made in such a way that only a few inexpensive components are required and where the cable manufacturer or harnessing company may pre-assemble the component by connecting a cable terminated with electrical connectors at both ends.

SUMMARY OF THE INVENTION

A cable bushing is disclosed which provides for an electromagnetically tight guidance of a shielded electrical cable. In this invention, the shield has been exposed in the bushing area by removal of the cable jacket. The cable is guided through a partition opening in a wall. The bushing is provided with at least two electrically conductive shells which can be attached to the exposed area of the shield from a radial direction and whose inner surface is adapted to the outer surface of the shield. The bushing contains an attachment device for attaching the cable bushing in the partition opening. The outer contour of the shells is matched to the outer contour of the cable jackets, the shells are surrounded by an electrically conductive sleeve, the inner contour of which is adapted to the outer contour of the cable jacket and the shells in such a way that the sleeve can be moved on the cable jacket and on the shells attached to the exposed part of the shield, in the longitudinal direction of the cable. One disk element each is arranged on the outer circumference of the sleeve at both sides of the axial position of the partition and at least one of the disks is designed as an annular disk having a radial slot which serves to place the disk on the sleeve and which is at least as wide as the outer dimensions of the part of the sleeve bearing the annular ring. The sleeve is provided with an outside thread for at least one threaded nut at least on the axial side of the position of the partition where the annular disk is provided. The outer dimensions of the two disk elements are larger than the outer dimensions of the axial side of the sleeve having the outside thread including the threaded nut screwed thereto and smaller than the dimensions of the partition opening.

BRIEF DESCRIPTION OF THE DRAWINGS

FIG. 3 is a front view of a half shell of the cable bushing according to FIG. 1.

FIG. 4 is a lateral view of the half shell shown in FIG. 3.

FIG. 5 is a longitudinal lateral view of a sleeve of a cable bushing in FIG. 1.

FIG. 6 is a front view of the sleeve, seen from the right side in FIG. 5.

FIG. 7 is a top view of an annular disk of the cable bushing shown in FIG. 1.

FIG. 8 is a lateral view of the annular disk.

DETAILED DESCRIPTION OF THE PREFERRED EMBODIMENTS

Figure 1:
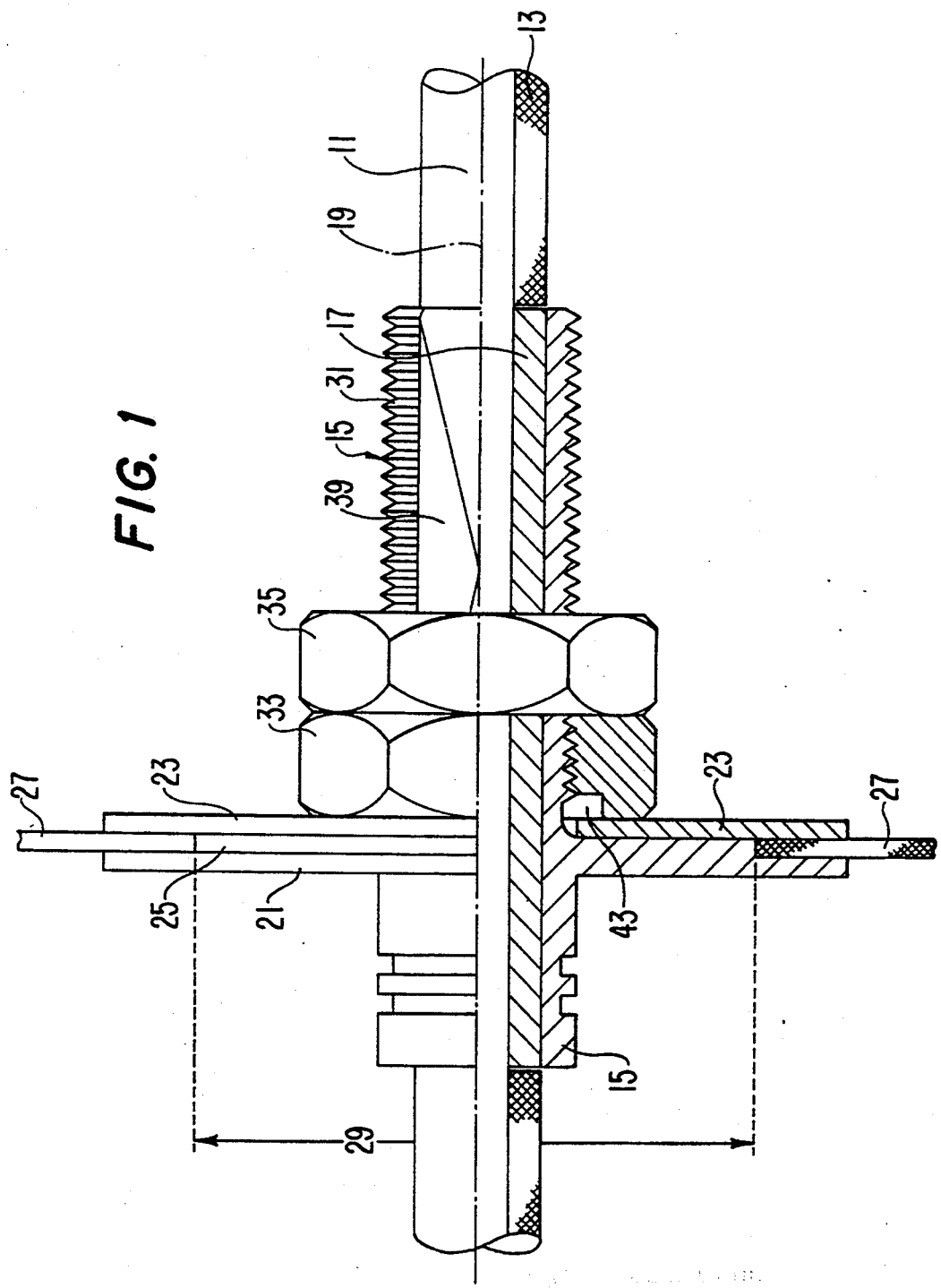
FIG. 1 is a cutaway section of a cable with a cable bushing mounted thereto and with an out lined partition.

A cable bushing is provided in which the outer contour of the shells is congruent with the outer contour of the cable jacket and where the shell parts are surrounded by an electrically conductive sleeve, the inner contour of which is adapted to the outer contour of the cable jacket and the part shells in such a way that the sleeve can be moved on the cable jacket and on the part shells attached to the exposed part of the shield, in the longitudinal direction of the cable. In addition, the bushing has two electrically conductive disk elements on the outer circumference of the sleeve with one disk at each side of the axial position of the partition and with at least one of said disk elements being designed as an annular disk which can be displaced relative to the sleeve, and being provided with a radial slot which serves to radially place the disk on the sleeve and being at least as wide as the outer dimensions of the sleeve area bearing the annular disk. The sleeve is provided with an outside thread for at least one threaded nut, at the axial side of the partition where the annular disk is provided. The outer dimensions of the two disk elements are larger than the opening in the partition and the outer dimensions, at least of the axial side of the sleeve with the outside thread, including the tightened threaded nut, are smaller than the opening in the partition.

The invention also provides for a cable assembly with a shielded electrical cable and one electrical connector at each cable end, wherein the jacket has been stripped from the shield in a section between both cable ends. This cable section is provided with the inventive cable bushing. The dimensions of the partition opening and the dimensions of at least the connector provided at the same side of the partition as the annular disk are designed in such a way that said connector can be guided through the partition opening.

The part shells in a preferred design which includes the sleeve, are preferably joined by soldering to obtain a particularly high degree of electromagnetic tightness.

The cable bushing allows for pre-assembly by the cable manufacturing or harnessing company, where the length of the electrical cable is adjusted. The cable jacket is removed from the cable over a certain length to expose the cable shield. The electrically conductive part shells, preferably half shells, are attached to the exposed cable shield. The outside of the half shells are flush with the remaining cable jacket. Subsequently, the sleeve is slipped over the jacket from one cable end up to the part shells. Preferably the cable shield is soldered to the part shells, and the sleeve. A threaded nut, and a securing nut are slipped over the cable from the side where the annular disk is attached to the sleeve and is screwed to the outside thread of the outer sleeve. Finally, the two electrical connectors are mounted to the cable ends.

The harnessed cable is then taken to the site of application, where it is built into an electromagnetically shielded unit of a machine, vehicle or aircraft. When the cable assembly is guided through and mounted to a partition opening of the unit, the cable assembly is fed through the partition opening, with the electrical connector that is located on the side of the threaded nut first. The annular disk is not attached to the sleeve of the cable bushing. The cable of the cable assembly is guided through the partition opening until the disk element which is not designed as an annular disk, and which is preferably an integral part of the sleeve, is in direct contact with the part of the partition surrounding the partition opening. Subsequently, the annular disk is radially placed on the sleeve, on the opposite side of the partition, using its radial slot. Also, subsequently the threaded nut is tightened towards the partition, which moves the annular disk closer to the disk element located on the other side of the partition while the partition area surrounding the partition opening between the two disk elements is clamped.

Since the partition of an electromagnetically tight unit consists of an electrically conductive metal and is electrically connected to the exposed cable shield through the electrically conductive disk elements, the electrically conductive sleeve and the electrically conductive part shells, in such a way that the disk elements cover the partition opening completely, the complete electromagnetic tightness of the cable bushing is assured. The invention therefore provides for a cable bushing which is suitable for EMI-applications.

The invention and further aspects relating to benefits of the invention are best understood by reference to the accompanying drawings.

FIG. 1 shows a cable 11 in the form of a coaxial cable with a tubular electrical shield and a surrounding cable jacket 13. A sleeve 15 consisting of an electrically conductive material, preferably an electrically highly conductive metal copper or brass is located on the cable jacket. As indicated in FIG. 1, the jacket 13 has been stripped from the shield of the cable over a length equalling the length of the sleeve. In this area, two half shells 17 consisting of an electrically conductive, preferably highly conductive material are attached to the shield. In FIG. 1, which shows the cable bushing provided by the present invention and the cable 11 above a longitudinal cable axis 19 in a longitudinal lateral view and under the longitudinal axis 19 of the cable in a sectional view, only the lower half shell 17 is shown. As indicated in the drawing, the half shell 17 is as long as the sleeve 15 and radially as thick as the cable jacket 13 which it replaces in the area of the sleeve 15. In other words, the half shell 17 is flush with the exposed shield at its inner circumference and with the cable jacket 13 at its outer circumference. The internal diameter of the sleeve 15 equals the outer diameter of the cable jacket 13 and the half shells 17. Therefore, the sleeve 15 can be pushed from one longitudinal end of the cable 11 over the cable jacket 13 and the half shells 17.

The half shells 17 may be soldered to the exposed shield of the cable 11 before or after the sleeve 15 has been slipped over the cable. Preferably, the sleeve 15 is also soldered to the half shells 17, which makes a particularly effective electrical contact between the shield of the cable 11, the half shells 17 and the sleeve 15.

The cable bushing is provided with two disk elements. A cover disk 21 which forms an integral part with the sleeve 15 in the embodiment shown in the drawing, and an annular disk 23 which is a separate component not integrated in the sleeve 15. The cover disk 21 is provided with an axial nose 25 of a smaller outer diameter than the cover disk 21. The thickness and the outer circumference of the axial nose 25 correspond to the thickness of a partition 27 and the shape of an opening 29 formed in the partition 27.

The part of the sleeve 15 located to the right of the cover disk 21 in FIG. 1 is provided with an external thread at its outside. A threaded nut 33 and a counter-nut 35 can be screwed to the outside thread 31. The annular disk 23 can be tightened by the threaded nut towards the cover disk 21 with the partition 27 in between in order to attach the cable bushing to the partition 27. The threaded nut 33 is secured and held stationary by the counter-nut 35.

As shown in FIG. 1, the outer diameters of the part of the sleeve 15 provided with an outside thread 31. The threaded nut 33 and the counter-nut 35 are smaller than the partition opening 29, whereas the outer diameters of the cover disk 21 and the annular disk 23 are larger than the partition opening 29. When the annular disk is removed, the cable bushing mounted to the cable can therefore be guided through the opening 29 in the partition 27 until the outer area of the cover disk 21 which projects further than the axial nose is in contact with the left side of the partition 27 in FIG. 1 so that the axial nose fills the entire partition opening 29.

Figure 2:
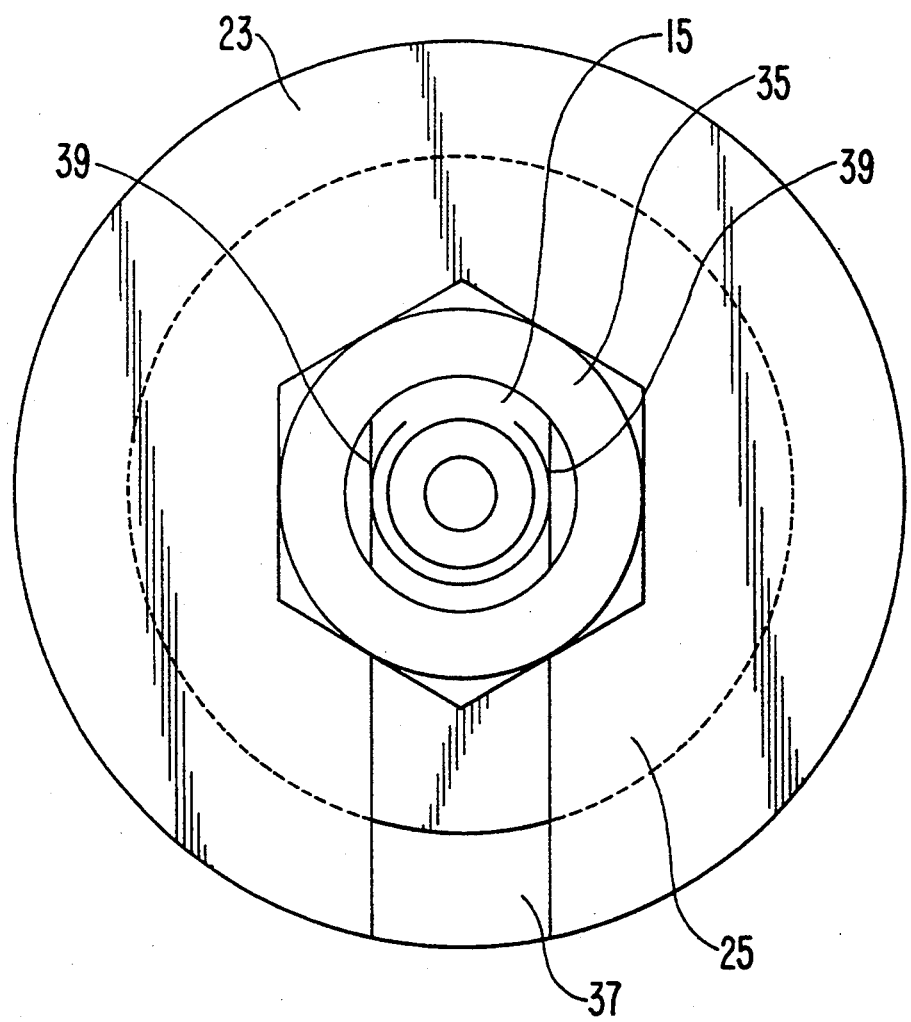
FIG. 2 is a lateral view of a cable bushing, seen from the right side in FIG. 1, without partition.

The nuts 33 and 35 are screwed on at a position sufficiently away from the cover disk 21 that the annular disk 23 can be mounted to the sleeve 15 between the partition 27 and the threaded nut 33 in the radial direction. This is rendered possible by a radial slot 37 in the annular disk 23, as shown in FIGS. 2 and 7. The radial slot 37 radially traverses the entire ring area of the annular disk 23 up to the central ring hole of the annular disk 23. When the annular disk 23 is placed onto the sleeve 15, a radial outer circumferal area of the annular disk 23 overlaps the area of the partition 27 surrounding the partition opening 29. The partition 27 is clamped between the cover disk 21 and the annular disk 23 by screwing the threaded nut 33 towards the partition 27. Then the counter-nut 35 is screwed against the threaded nut 33 in order to prevent the latter from becoming loose.

The embodiment described could be modified by mounting the axial nose 25 to the side of the annular disk 23 facing away from the threaded nut 33 instead of being mounted to the cover disk 21. Alternatively the axial nose 25 could be divided between the cover disk 21 and the annular disk 23 in such a way that both disks are provided with a correspondingly shorter axial nose, both axial noses having a total axial length corresponding to the thickness of the partition 27.

Another option is to construct the cover disk 21 not as a relatively thin disk element but over a larger axial length, which may reach up to the left end of the sleeve 15 in FIG. 1.

In order to facilitate the tightening and loosening of the annular disk 23, the part of the sleeve 15 with the outside thread 31 is provided with two diametrically opposed flattened areas 39, which are best illustrated in FIGS. 2 and 6. These flattened areas 39 make it possible to hold the sleeve 15 with a suitable tool, such as a wrench.

FIG. 2 shows a lateral front view of the completely assembled cable bushing, shown from the right side of FIG. 1. This figure also shows the annular disk 23 with the radial slot 37, the axial nose 25, the part of the sleeve 15 provided with the flattened areas 39 and the tightened counter-nut 35.

FIGS. 3 and 4 show one of the two-half shells 17 seen from the face and longitudinal side.

FIG. 5 shows a lateral longitudinal view of the sleeve 15 and the cover disk 21 with the axial nose 25, which forms an integral part of the sleeve 15.

FIG. 6 shows a lateral front view of the sleeve, seen from the right side in FIG. 5.

FIGS. 7 and 8 show a lateral front view and a lateral view of the annular disk 23. As is particularly clearly shown in FIG. 8, the annular disk 23 is provided with an axial nose 41 at the side facing the threaded nut 33. When the cable bushing is completely assembled, the nose 41 projects into a complementary axial recess 43 in the side of the threaded nut 33 facing the annular disk 23. The axial recess 43 is shown in FIG. 1 in the longitudinal section. The axial nose 41 and the axial recess 43 facilitate the correct radial alignment of the annular disk 23 after the latter has been placed onto the sleeve 15 and while the threaded nut 33 is tightened.

Figure 9:
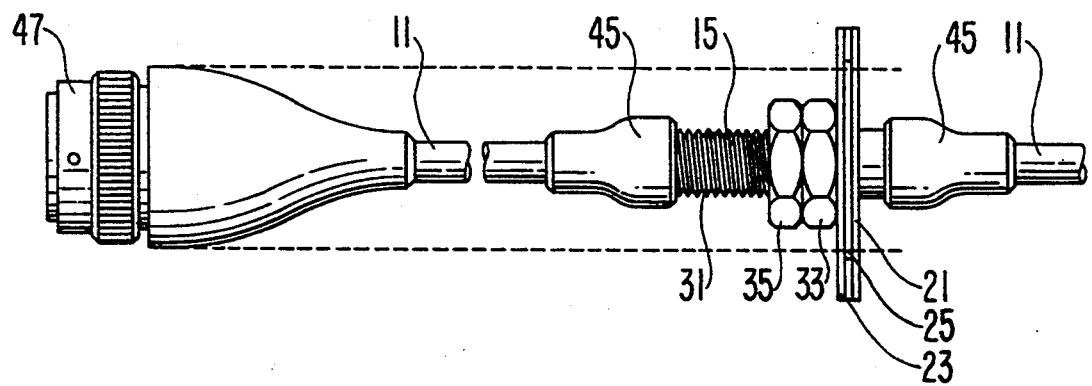
FIG. 9 is a perspective view of a cable assembly with a cable bushing according to FIG. 1.

FIG. 9 shows a part of a cable assembly with a pre-assembled cable bushing according to the present invention. The cable bushing is displaced by 180° compared to FIG. 1. The interface areas between the cables 11 and the end area of the sleeve 15 located at the side of the cover disk 21 and the end area of the sleeve 15 with the outside thread 31 are each provided with a shrinkdown plastic tubing 45 which serves to attach the sleeve 15 to the cable 11, in particular if the sleeve 15 is not soldered to the half shells 17. If the half shells 17 only are soldered to the exposed shield of the cable 11, the cable bushing can be detached from the cable, for instance to facilitate repairs.

The pre-assembled cable assembly is provided with one plug connector 47 at each end. FIG. 9 shows only one cable end with such a plug connector 47. Actually both ends are terminated by such plug connectors 47, which may, however, be of different shapes. The outer dimensions of the plug connectors 47 are adapted to the dimensions of the partition opening 29 in such a way that at least the plug connector 47 mounted to the end of the cable 11 which extends from the end of the sleeve 15 with the outside thread 31 can be inserted through the partition opening 29. FIG. 9 indicates this by dotted lines which show that the maximum outer diameter of the plug connector 47 is smaller than the diameter of the axial nose 25 which corresponds to the diameter of the partition opening 29.

For assembling the cable assembly shown in FIG. 9 at its site of installation, the counter-nut 35 and the threaded nut 33 are loosened from the annular disk 23 and the annular disk 23 is removed from the sleeve 15 using the radial slot 37. Subsequently the cable assembly is inserted through the partition opening 29, with the plug connector 47 first until the cover disk 21 contacts the parition 27 and the axial nose 25 has been accommodated by the partition opening 29. Finally, the annular disk 23 is reattached to the sleeve 15 and tightened to the partition 27 by means of the nuts 33 and 35 in the direction of the cover disk 21. The result is very good electromagnetic protection between the shield of the cable 11 and the electromagnetically shielding partition 27. There are no electromagnetic leakages which might cause spurious radiation or interference irradiation at the cable bushing.

We claim:

1. A cable bushing for electromagnetically tight guidance of an electrical cable having a shield that has been exposed in an area by removing a cable jacket wherein the bushing is used around a partition opening through which the cable is led, said bushing comprising (a) at least two electrically conductive part shells attached to an exposed area of the cable shield from a radial direction, having an inner circumference adapted to the outer circumference of the shield;

(b) an electrically conductive sleeve which surrounds the part shells, the sleeve having an inner section adapted to the outer section of the cable jacket and the part shells so that the sleeve can move on the cable jacket and on the part shells attached to the exposed area of the shield in the longitudinal direction of the cable;

(c) disk elements, wherein one disk element is arranged on the outer circumference of the sleeve at each side of the axial position of the partition opening and wherein at least one of the disk elements is an annular disk provided with a radial slot which serves to place the disk on the sleeve and is at least as wide as the outer dimensions of the sleeve bearing the annular disk; and (d) at least one threaded nut attached to the sleeve having outside threads at least on the axial side of the partition opening where the annular disk is provided, and wherein the outer dimensions of the disk elements are larger than the dimensions of the partition opening and the outer dimensions of at least the axial side of the sleeve with the outside thread, including the threaded nut screwed thereto, are smaller than the dimensions of the partition opening.

2. A cable bushing of claim 1, for a round cable, wherein the part shells form a ring cylinder when they are attached to the exposed shield and that the sleeve is designed as a ring cylinder.

3. A cable bushing of claim 1 wherein the part shells are two half shells.

4. A cable bushing of claim 1, wherein one of the two disk elements forms an integral part of the corresponding axial side of the sleeve.

5. A cable bushing of claim 1, wherein one of the disk elements is provided with an axial nose which is located on the disk side facing the partition opening and whose axial and radial dimensions are such that the axial nose can be inserted into the partition opening so that it completely fitts the latter.

6. A cable bushing of claim 5, wherein both disk elements are provided with one axial nose each, both of which fill out the partition opening together.

7. A cable bushing of claim 1, wherein the annular disk is provided with an axial nose which is located on the axial disk side facing the threaded nut and which fits into a complementary axial recess on the side of the threaded nut facing the annular disk.

8. A cable assembly comprising (a) an electrical cable provided with an electrical shield and a surrounding cable jacket and where the jacket is stripped from the shield to form an exposed area, (b) a cable bushing for electromagnetically tight guidance used around a partition opening through which the electrical cable is led, said bushing comprising:

(i) at least two electrically conductive part shells attached to the area where the jacket is stripped and having an inner circumference adapted to the outer circumference of the shield wherein the diameter of the outer section of the part shells is the same as the diameter of the outer section of the cable jacket;

(ii) an electrically conductive sleeve surrounding the part shells having an inner section adapted to the outer section of the cable jacket and part shells so that the sleeve can move in a longitudinal direction on the cable jacket and on the part shells attached to the exposed area;

(iii) disk elements wherein one disk element is arranged on the outer circumference of the sleeve at each side of the partition opening and wherein at least one of the disk elements is an annular disk having a radial slot serving to place the disk on the sleeve and being at least as wide as the outer dimensions of the sleeve bearing the annular disk; and (iv) at least one threaded nut attached to the sleeve having outside threads on the axial side of the partition opening where the annular disk is provided and wherein the outer dimensions of the disk elements are larger than the dimensions of the partition opening and the outer dimensions of at least the axial side of the sleeve with the outside thread including the threaded nut screwed thereto, are smaller than the dimensions of the partition opening; and (c) electrical connectors wherein a connector is on each cable end and wherein the electrical connector which is located at the same side of the partition opening as the annular disk is guided through the partition opening.

9. A cable assembly of claim 8, wherein a shrinkdown plastic tube is applied to the axial ends of the sleeve and the areas of the cable adjacent to these axial ends.

10. A cable assembly of claim 8, wherein the part shells are soldered to the exposed shield.

11. A cable assembly of claim 10, wherein the sleeve is soldered to the part shells.

* * * * *